United States Patent [19]

Stefano

[11] Patent Number: 4,949,409

[45] Date of Patent: Aug. 21, 1990

[54] PNEUMATIC LIFT TO AID BEDPAN USE

[76] Inventor: Sandra Stefano, 25600 Columbus Rd., Bedford Hts., Ohio 44146

[21] Appl. No.: 387,217

[22] Filed: Jul. 28, 1989

Related U.S. Application Data

[63] Continuation-in-part of Ser. No. 244,287, Sep. 15, 1988, abandoned.

[51] Int. Cl.[5] .................... A01G 9/00

[52] U.S. Cl. .................... 5/90; 5/463; 5/453

[58] Field of Search .................... 5/90, 446, 461, 463, 5/449, 453, 458; 4/450, 456, 457

[56] References Cited

U.S. PATENT DOCUMENTS 3,729,249 5/1973 Rosecrans .................... 5/456 X
3,875,599 4/1975 Mracek et al. .................... 5/81 R X
3,935,604 2/1976 Collins .................... 5/90
4,011,610 3/1977 Parker, III .................... 5/463 X
4,054,960 10/1977 Pettit et al. .................... 5/461 X
4,207,633 6/1980 Smith et al. .................... 5/463 X

FOREIGN PATENT DOCUMENTS 598426 2/1948 United Kingdom .................... 5/90

*Primary Examiner*—Michael F. Trettel
*Attorney, Agent, or Firm*—Donald A. Bergquist

[57] ABSTRACT

An inflatable underlayment is provided for a bedridden patient to elevate the patient and, by means of a wedge-shaped cavity in the inflated underlayment, to provide clearance for the placement of a fracture pan for use as a bedpan by the patient, wherein the placement and removal of the fracture pan requires no movement of the patient.

16 Claims, 2 Drawing Sheets

PNEUMATIC LIFT TO AID BEDPAN USE

This application is a continuation in part of Ser. No. 244,287, filed Sept. 15, 1988, now abandoned.

INTRODUCTION

An inflatable underlayment is provided for a bedridden patient to elevate the patient and, by means of a wedge-shaped cavity in the inflated under layment, to provide clearance for the placement of a fracture pan for use as a bedpan by the patient, wherein the placement and removal of the fracture pan requires no movement of the patient.

Anyone who has been confined to bed and has faced using a bedpan for defecation while so confined, appreciates the embarassment and discomfort associated with the use of a bedpan while bedridden. The discomfort is especially critical for patients whose condition requires them to remain nearly horizontal, not allowing the patient to be raised to approach a sitting position. In such situations, the elevation of the hips caused by the inserted bedpan puts the patient into a position in which most find defecation nearly impossible. Little need be said of the personal discomfort that arises from sustained periods during which defecation is denied, not to mention the physiologic difficulties that may result, such as diverticulitis or impaction.

BACKGROUND

In the many years since bedpans were introduced and despite the many advances of medicine, no substantial practical progress has been made to ease the discomfort in using a bedpan, especially when bedridden. In some cases, a specialized bedpan known as a fracture pan is used.

A fracture pan is a bedpan that is smaller than the standar bedpan with which most hospital patients are familiar. A fracture pan is tapered like a wedge to allow the thin edge to be inserted first under the hips, gradually to raise the hips and buttocks. Most fracture pans are also tapered like a wedge in plan view also, presumably to ease the insertion by minimizing the area of the pan placed furtherest under the patient. Fracture pans typically have a rim surrounding the periphery of the pan and extending therefrom. The fracture pan is especially designed to minimize the movement of a patient suffering from a severe fracture, or back or neck injury, the treatment for which requires confinement to bed with minimal movement. Even a fracture pan normally requires the lifting of the hips to allow placement of the fracture pan into a position for use. Even this slight motion can bring excruciating pain and potential hazard to certain bedridden patients.

A poll of medical professionals revealed no commercially available equipment to help the patient to deal with this problem. A search of the patent literature reveals limited prior art, none of which is seen to anticipate the present invention.

U.S. Pat. Nos. 211,741 (Johnson), 1,981,666 (Ridley), and 4,271,546 (Martin) all teach devices that elevate the hips for insertion of a bedpan. The devices described in these patents all have shortcomings that are overcome by the present invention.

The teachings of Ridley and Johnson both include elevation of the torso as well as the hips but not the legs. Martin lifts only the hips, not the legs nor the chest. In the teachings of all of these patents, the hips and lower abdomen are raised to a higher elevation than the chest and the legs; medical professionals have pointed out to me that putting certain patients in a position wherein the abdomen is higher than the chest can be dangerous in that their breathing can be made more difficult due to added pressure on the bottom of the diaphragm. my research indicates that the lack of support for the legs is also a serious shortcoming that could cause considerable discomfort or pain to the patient. In contrast, the present invention raises the entire body safely, gently, and, most importantly, evenly.

One prior patent teaches a device that provides total support of the patient's body as it is raised to provide for the placement of a bedpan for use by the patient. U.S. Pat. No. 3,875,599 (Mracek et al.) teaches an inflatable underlayment pad that, when it is fully inflated, is sufficiently rigid that additional inflatable spacers at each end of that pad may be inflated to lift that entire pad, patient and all, four to twelve inches above the underlying mattress for placement of a bedpan or other receptacle under that pad. This high degree of rigidity must be the result of inflation pressures much higher than are typical of common air mattresses and much higher than would be available from inexpensive inflation devices. Such high pressures as would provide such rigidity must also require the use of very specialized materials for constructing such a mat—materials that are substantially similar to the GoodYear Aerospace Corporation's three-dimensional structural fabrics sold under the name AIRMAT, which are named in Mracek's patent.

When the pad of Mracek's invention reaches the desired elevation by the inflation of said inflatable spacers, the clearance under that pad is sufficient to place a standard bedpan beneath that pad in register with a through passage in that pad. That through passage is in register with the rectal area of the bed patient for defecation through that through passage and into that bedpan below (not within) that through passage. That equipment clearly requires no motion of or by the patient, whatsoever. An alternative embodiment of that invention involves the inserting of a baglike disposable bedpan into the through passage from above, which process requires some considerable movement of or by the bedridden patient and manipulation by the attendant to position and anchor the bedpan in place. Movement is again required for the careful removal of the disposable bedpan, which is presumably now contaminated with body wastes.

In contrast to Mracek's invention, the present invention does not require additional inflatable spacers to lift the basic unit, because the fracture pan is inserted from above the inflatable pad, not placed below it. Owing to the smaller size and wedge shape of the fracture pan, which shape is matched by the through passage of the present invention, and owing to the relatively lower inflation pressure and concomitant softness of the present invention when fully inflated, the fracture pan can be inserted and removed with little or no movement of the patient. The insertion of the fracture pan is accomplished by slipping the same between the patient's knees or lower legs or even at his feet and sliding it along and under the legs and downward into its use position under the buttocks in register with the rectal area of the patient. Note that the only space required between the legs is that space that will allow the passing of the attendant's hand and wrist between the legs. Such space is most often present when a patient is in a supine position, so there is no need for the patient's legs or hips to be moved as the fracture pan is inserted while using this invention. The wedge shape of the fracture pan helps during insertion to depress the surface of the inflated pad rather than requiring the patient to be lifted or displaced in any way.

Thus, it is an object of this invention to provide a pneumatic underlayment lifting device for use under a bedridden patient to lift that patient sufficiently to provide clearance for the insertion of a fracture pan or similar device in a wedge-shaped cavity in the inflated pneumatic lifting device.

It is also an object of this invention to provide such a pneumatic lifting device for use by a bedridden patient, such that the lifting device supports the body over substantially the entire length thereof.

It is also an object of this invention to provide such a pneumatic lifting device that may remain under the patient in either an inflated or, preferably, in a deflated state while not required for use of a bedpan.

These and other objects of my invention will be made clear in the following description of my invention.

DETAILED DESCRIPTION OF THE INVENTION

This invention will be most clearly understood by referring to the attached drawings wherein the same part is identified by using the same reference number throughout the several figures.

Figure 1:
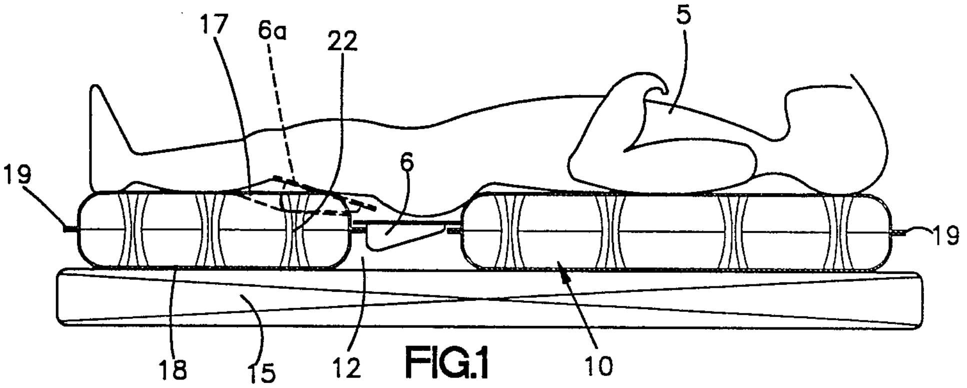
FIG. 1 shows a patient using a fracture pan while employing the subject invention, shown in cutaway section for clarity.

FIG. 1 shows a patient 5 using a fracture pan 6 while employing the subject invention 10, shown in cutaway section for clarity. A phantom view of the fracture pan as it is would be during insertion or withdrawal is indicated as **6*a*. The features of the cavity 12 are more easily seen in the detailed views of FIG. 4 and FIG. 5 where cavity 12 is seen to have a lip or ridge 13 around the periphery thereof which ridge engages the rim 14 of the fracture pan, which ridge is seen to be supporting the fracture pan 6 above the mattress 15. In practice, this ridge is formed by a broad heat seal fastening a top surface 17 and a bottom surface 18 that comprise the article of this invention. A ridge formed in this manner is sufficiently rigid to support the fracture pan and its contents when the cushion is inflated; in this embodiment, the ridge is not inflatable. An inflataable ridge is not hereby proscribed, however. The important consideration is that the ridge is adapted to follow the shape of the wedge-shaped fracture pan, as shown in detail in the plan view of FIG. 5**, and to be capable of supporting the same.

Figure 2:
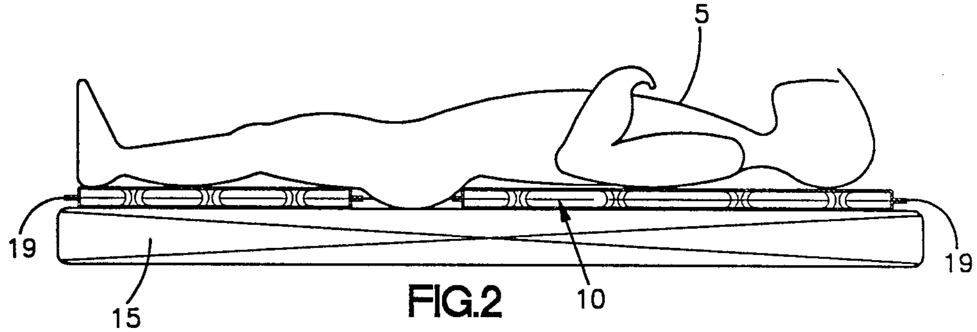
FIG. 2 shows a view similar to FIG. 1, but where the subject invention is deflated.
Figure 4:
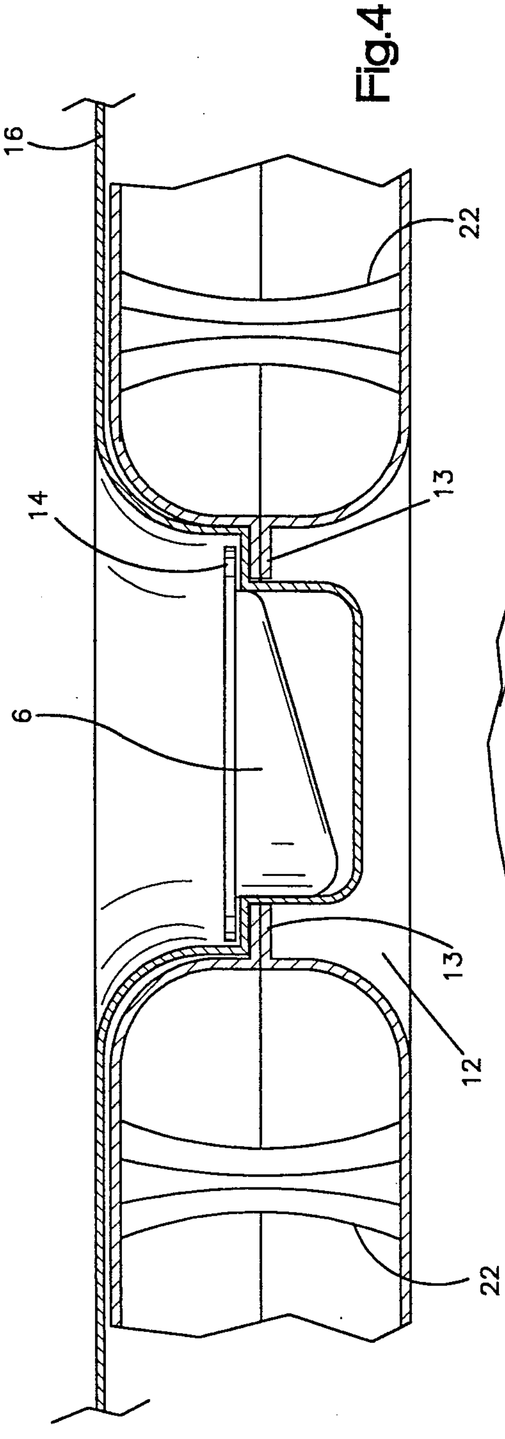
FIG. 4 shows a detailed side view of the cavity of the invention.
Figure 5:
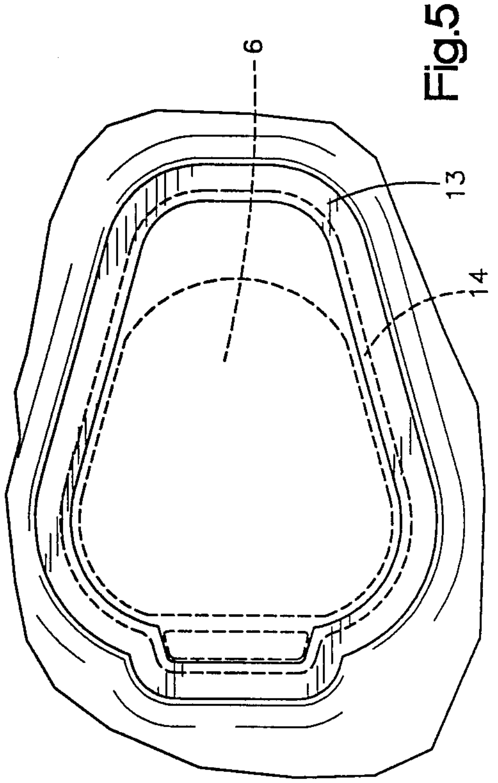
FIG. 5 shows a detailed plan view of the cavity of the invention.

FIG. 2 is a view similar that of FIG. 1, but wherein is shown the patient with the subject invention deflated. In practice, the invention may be used either in a continuously inflated condition or in a deflated condition wherein it is inflated only as needed for bedpan use. In practice the invention is used as an underlayment beneath a bedsheet; FIG. 4 shows such a condition to illustrate that the bedsheet 16 is to be slack enough in the region of the cavity for the fracture pan 6 to be inserted into the cavity without obstruction by the bedsheet. Proper construction of the inflatable cushion creates no more discomfort to the patient than does the normal bedsheet and other under layment pads that might be used.

Figure 3:
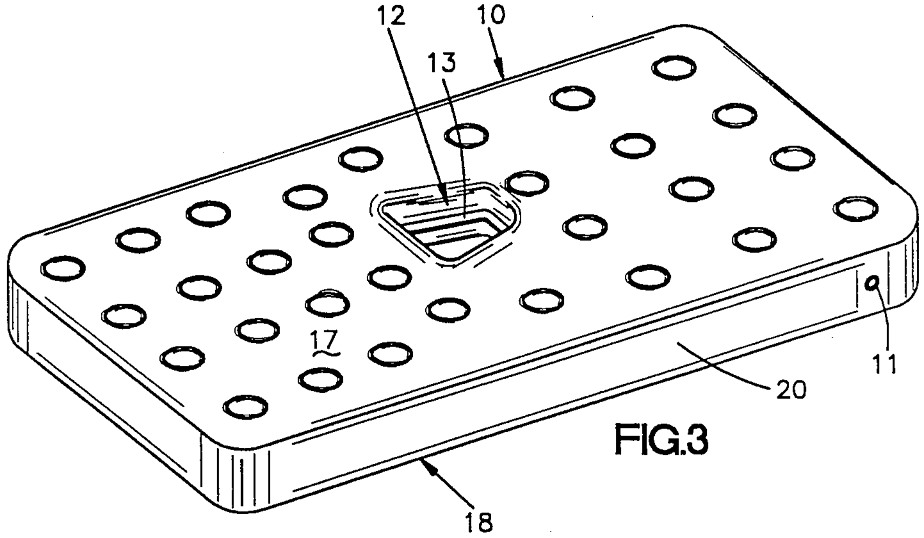
FIG. 3 shows a perspective view of the invention to more clearly show its features.

In FIG. 3, the best mode of construction of the device of this invention is shown. In this embodiment, the lifting device is fabricated from two sheets of air-impermeable material such as a vinyl plastic polymer or other thermoplastic sheet stock, to name some non-limiting examples. The two sheets forming the top 17 and bottom 18 surfaces of the lifting device are joined at their peripheries by means of an intermediary sheet forming a side wall 20.

An acceptable mode of construction is shown in FIGS. 1, wherein the sheets forming the top 17 and bottom 18 surfaces of the lifting device are joined at their peripheries by means of a simple heat seal 19, there being no intermediary sheet forming a side wall.

in either construction, the top sheet 17 and bottom sheet 18 are joined at intervals over their areas, creating what might best be described as a tufted bladder construction, which joinings are made by means of intermediate strips 22 attached at each respective end thereof to the top sheet 17 and bottom sheet 18, thereby the length of the strips 22 restricts the thickness attained by the lifting device 10. The best mode construction results when these strips are formed into split cylinders whose circular ends are attached to the top and bottom sheets, as shown in the drawings. The art pertaining to the construction and use of inflatable mattresses and the like should be consulted for details of construction and variations thereof, including valving and inflating means 11 and inflating equipment.

FIG. 3 is a perspective view of the article of this inventiont in best mode. The wedge-shaped cavity 12 in the inflated cushion is formed merely by making a continuous seal forming a ridge 13 in a roughly triangular or wedge shape at the appropriate location within the area of the top and bottom sheets 17 and 18, thereby joining the top and bottom sheets. The shape of this seal in plan view is to be the same tapered or wedge shape of the fracture pan in plan view. The seal is made wide to form a ridge to service as a guiding element for the inserting of the tapered fracture pan 6 and also to serve as a supporting element for the fracture pan after insertion thereof. This ridge may be up to about two inches in width or as little as one inch in width. It is important that the ridge be capable of supporting the weight of the fracture pan and the wastes collected therein. The shape of the cavity and the ridge 13 formed by the seal creating the wedge-shaped cavity act cooperatively in conjuction with the wedge shape of the fracture pan to provide both guidance and support therefor.

As the fracture pan is inserted by sliding it along and under the patient's legs, it encouters the cavity into which it begins to drop. The rim 14 makes contact with the ridge 13; the ridge 13 supports and guides the rim 14 and thereby the fracture pan to a position wherein it is supported by the rim 14 resting upon the ridge 13. Thus the ridge 13 provides both guidance during insertion and removal of the fracture pan and support for the fracture pan during use thereof.

The invention is especially valuable in the treatment of patients having a back or neck injury; these patients may be exposed to further injury if an attempt is made to place a bedpan under them, should the need arise. The inflation of the device of this invention provides a uniform and gentle lifting force that extends over the entire torso and head to lift the body with little, if any, disturbance thereto.

In an alternative embodiment, the lifting device may be shortened to underlay the head, torso, and hips of the patient, but only with the understanding that such an embodiment could not be universally applied to all patients. Such an embodiment would lift the chest and abdomen to the same level, thereby overcoming one of the shortcomings of prior art devices, but by not lifting the legs it presents an increase in the difficulty of defecation. In the preferred embodiment, however, the device extends the full length of the bed and would be suitable for use with all bedridden patients, regardless of the reason for their confinement.

it is most likely that an air pump would be used for inflating the lifting device of this invention. It is noted that suitable electrical air pumps are readily available that are operable from a storage battery or from household current, either of which may be used in the home environment; air or nitrogen under pressure is often available in hospital rooms, so a separate pump may not be desirable nor needed in the hospital environment, especially where oxygen is in use and some electrical equipment may be forbidden.

Having thus described my invention, including a totally functional specific example thereof, I desire to include within the scope of her invention those improvements that would be immediately obvious to one skilled in the art, some, but not all of those improvements have been referred to herein. I desire the breadth of my invention to be limited only by the scope of the claims appended hereto.

I claim:

1. A pneumatic lifting device and underlayment adapted to be placed under a supine-positioned human and for use with a fracture type bedpan of common commercial use, said fracture pan having a tapered cross section in side view and a tapered cross section in plan view and an overhanging rim around the periphery thereof, wherein said lifting device comprises an upper sheet and a lower sheet, said two sheets are attached at the edges thereof to form a bladder capable of holding air therein, wherein said lifting device has a through passage through the thickness thereof in register with the rectal area of said supine-positioned human and wherein said lifting device is adapted to be inflated by external means or deflated as desired, and, when inflated at relatively low pressures as in an air mattress, thereby lifting said human above an underlying substantially horizontal surface, and when said lifting device is inflated, said through passage in said lifting device forms a wedge-shaped cavity for receiving said fracture pan in register with the rectal region of said human, wherein the shape of said through passage in plan view matches the tapered shape of said fracture pan in plan view, and wherein said cavity has around the periphery thereof a projecting ledge-like ridge adapted to engage said rim of said fracture pan and thereby to support said fracture pan in a use position in said cavity, and wherein, owing to said low inflation pressure, which allows the depressing of the top surface of said lifting device, said fracture pan may be inserted into and removed from said cavity without moving the legs or hips of said supine-positioned human.

2. The lifting device of claim 1 wherein said projecting ridge is adapted to engage the periphery of said rim as said fracture pan is inserted into said cavity, thereby to guide said fracture pan into its use position wherein it is supported by said ridge.

3. The lifting device of claim 1 wherein said upper and lower sheets are attached by means of an intermediary sheet forming a side wall of said bladder.

4. The lifting device of claim 3, wherein said two sheets are additionally attached at multiple points over the surfaces thereof to form a tufted bladder, said additional attachements are by means of intermediary sheets that define the thickness of the inflated bladder. said additional attachments are by means of intermediary sheets that define the thickness of the inflated bladder.

5. The lifting device of claim 4 wherein said top and bottom sheets comprise a thermoplastic material; said sidewall comprises a thermoplastic material; and said additional intermediary sheets comprise a thermoplastic material.

6. The lifting device of claim 5 wherein said top and bottom sheets and said sidewall comprises a thermoplastic material.

7. The lifting device of claim 1, wherein said top and bottom sheets comprise a thermoplastic material.

8. The lifting device of claims 1 wherein said device is of a length to effectively contact the length of the body of said human extending from the head to the feet and of suitable width to comfortably support the entire said body when said device is inflated.

9. A combination comprising a fracture pan and a pneumatic lifting device and underlayment adapted to be placed under a supine-positioned human and for use with a fracture pan of common commercial use, said fracture pan having a tapered cross section in side view and a tapered cross section in plan view and an overhanging rim around the periphary thereof, wherein said lifting device comprises an upper sheet and a lower sheet, said two sheets are attached at the edges thereof to form a bladder capable of holding air therein, wherein said lifting device has a through passage through the thickness thereof in register with the rectal area of said supine-positioned human and wherein said lifting device is adapted to be inflated by external means or deflated as desired, and, when inflated at relatively low pressure as in an air mattress, thereby lifting said human above an underlying substantially horizontal surface, and when said lifting device is inflated, said through passage in said lifting device forms a wedge-shaped cavity for receiving said fracture pan in register with the rectal region of said human, wherein the shape of said through passage in plan view matches the tapered shape of said fracture pan in plan view, and wherein said cavity has around the periphery thereof a projecting ledge-like ridge adapted to engage said rim of said fracture pan and thereby to support said fracture pan in a use position in said cavity, and wherein, owing to said low inflation pressure, which allows the deperessing of the top surface of said lifting device, said fracture pan may be inserted into and removed from said cavity without moving the legs or hips of said supine-positioned human.

10. The combination of claim 9 wherein said projecting reige is adapted to engage the periphery of said rim as said fracture pan is inserted into said cavity, thereby to guide said fracture pan into its use position wherein it is supported by said ridge.

11. The combination of claim 9 wherein said upper and lower sheets are attached by means of an intermediary sheet forming a side wall of said bladder.

12. The combination of claim 11, wherein said two sheets are additionally attached at multiple points over the surfaces thereof to form a tufted bladder, said additional attachments are by means of intermediary sheets that define the thickness of the inflated bladder.

13. The combination of claim 12 wherein said top and bottom sheets comprise a thermoplastic material; said sidewall comprises a thermoplastic material; and said additional intermediary sheets comprise a thermoplastic material.

14. The combination of claim 11 wherein said top and bottom sheets and said sidewall comprise a thermoplastic material.

15. The combination of claim 9, wherein said top and bottom sheets comprise a thermoplastic material.

16. The combination of claims 9 wherein said device is of a length to effectively contact the length of the body of said human extending from the head to the feet and of suitable width to comfortably support the entire said body when said device is inflated.

* * * * *